United States Patent [19]

Tolpin et al.

[11] Patent Number: 4,692,318

[45] Date of Patent: * Sep. 8, 1987

[54] PROCESS FOR SIMULTANEOUSLY REMOVING NITROGEN OXIDES, SULFUR OXIDES, AND PARTICULATES

[75] Inventors: Thomas W. Tolpin, Highland Park; Richard A. Kretchmer, Clarendon Hills, both of Ill.

[73] Assignee: Amoco Corporation, Chicago, Ill.

[*] Notice: The portion of the term of this patent subsequent to Sep. 2, 2003 has been disclaimed.

[21] Appl. No.: 836,687

[22] Filed: Mar. 6, 1986

Related U.S. Application Data

[63] Continuation-in-part of Ser. No. 640,675, Aug. 13, 1984, Pat. No. 4,609,537.

[51] Int. Cl.$^4$ .......................... B01J 8/00; C01I 17/00; C01I 21/00; B01D 45/00
[52] U.S. Cl. ................................ 423/239; 423/215.5; 423/244; 55/73
[58] Field of Search .................... 423/235, 235 D, 239, 423/239 A, 242 A, 242 R, 244 A, 244 R, 215.5; 55/73

[56] References Cited

U.S. PATENT DOCUMENTS

| | | | |
|---|---|---|---|
| 2,551,905 | 5/1957 | Robinson | 423/244 |
| 3,454,355 | 7/1969 | Ryason | 423/239 |
| 3,832,445 | 8/1974 | Kouwenhoven et al. | 423/244 |
| 3,993,731 | 11/1976 | Morikawa et al. | 423/239 |
| 4,238,317 | 12/1980 | Vasalos et al. | 208/120 |
| 4,423,019 | 12/1983 | Bertolacini et al. | 423/244 |
| 4,609,537 | 9/1986 | Tolpin et al. | 423/239 |
| 4,609,539 | 9/1986 | Horecky et al. | 423/239 |

*Primary Examiner*—Gregory A. Heller
*Attorney, Agent, or Firm*—Thomas W. Tolpin; William H. Magidson; Ralph C. Medhurst

[57] ABSTRACT

A process is provided in which particulates, nitrogen oxides, and sulfur oxides are simultaneously removed from flue gases in a granular bed filter and scrubber with a nitrogen oxide-capturing reducing agent and a bed of sulfur oxide-capturing and particulate-removing material. The spent sulfur oxide-capturing and particulate-removing material can be regenerated in a lift pipe riser.

11 Claims, 5 Drawing Figures

PROCESS FOR SIMULTANEOUSLY REMOVING NITROGEN OXIDES, SULFUR OXIDES, AND PARTICULATES

RELATED APPLICATIONS

This patent application is a continuation-in-part patent application of patent application Ser. No. 640,675, filed Aug. 13, 1984, now U.S. Pat. No. 4,609,537, issued Sept. 2, 1986, of Thomas W. Tolpin and Richard A. Kretchmer for a Process for Simultaneously Removing Nitrogen Oxides, Sulfur Oxides, and Particulates.

BACKGROUND OF THE INVENTION

This invention relates to flue gas cleanup and, more particularly, to removing nitrogen oxides, sulfur oxides, and particulates from a gaseous stream, such as from a regenerator in a catalytic cracking unit.

Flue gases emitted in combustors, such as in regenerators and power plants, often contain undesirable levels of sulfur oxides (SOx), nitrogen oxides (NOx), and particulates which, if untreated, might pollute the atmosphere.

Sulfur oxides in the presence of water can form sulfuric acid causing acid rain. Nitrogen oxides may cause smog by photochemical reaction with hydrocarbons in the atmosphere. Particulates in flue gases typically include ash (soot) and/or spent combusted catalyst with trace metals, such as arsenic and other contaminants which, in excessive levels, could poison vegetation and livestock.

Over the years, various methods have been suggested for controlling and/or removing sulfur oxide and/or nitrogen oxide emissions. In catalytic cracking units, sulfur oxide control processes usually occur in the regenerator. In one widely used process, sulfur oxides are captured in the regenerator with sulfur oxide-capturing acceptors and subsequently converted to hydrogen sulfide in the reactor and the hydrogen sulfide is withdrawn with the product stream from the reactor and treated in a sulfur recovery plant. Some of the methods suggested for removing nitrogen oxides in regenerators, however, poison the cracking catalyst and are, therefore, unacceptable. Typifying these prior art methods for controlling sulfur oxide and/or nitrogen oxide emissions are those described in U.S. Pat. Nos. 2,493,218; 2,493,911; 2,522,426; 2,575,520; 2,863,824; 2,992,895; 3,023,836; 3,068,627; 3,264,801; 3,454,355; 3,501,897; 3,755,535; 3,760,565; 3,778,501; 3,832,445; 3,835,031; 3,840,643; 3,846,536; 3,892,677; 3,985,861; 3,993,731; 4,001,376; 4,006,066; 4,039,478; 4,153,534; 4,153,535; 4,181,705; 4,206,039; 4,218,344; 4,221,677; 4,233,276; 4,238,317; 4,241,033; 4,254,616; 4,258,020; 4,267,072; 4,300,997; 4,323,542; 4,325,811; 4,369,109; 4,369,130; 4,376,103; 4,381,991; 4,405,443; 4,423,019; 4,238,317; and 4,443,419. These prior art methods have met with varying degrees of success.

Flue gas streams discharged from regenerators, power plants, or other combustors are commonly directed through one or more dedusters, such as flue gas scrubbers, electrostatic precipitators, cyclones, bag houses, granular bed filters, or other filters, in order to remove particulates from the flue gas stream. Typifying these dedusters and other prior art particulate-removing devices are those shown in U.S. Pat. Nos. 2,551,905; 3,540,388; 3,550,791; 3,596,614; 3,608,529; 3,608,660; 3,654,705; 3,672,341; 3,696,795; 3,741,890; 3,769,922; 3,818,846; 3,882,798; 3,892,658; 3,921,544; 3,922,975; 4,017,278; 4,126,435; 4,196,676; and 4,421,038. These dedusters and prior art devices have met with varying degrees of success.

The combined use of flue gas scrubbers and electrostatic precipitators, while often effective to control particulate emissions, is very expensive and cumbersome.

It is therefore desirable to provide an improved process to remove nitrogen oxides, sulfur oxides, and particulates from gaseous streams.

SUMMARY OF THE INVENTION

An improved process is provided for efficiently, effectively, and economically removing nitrogen oxides (NOx), sulfur oxides (SOx), and particulates from gaseous streams, such as flue gases, to minimize emission of pollution and contaminants into the atmosphere. The novel process is particularly useful to clean up combustion off-gases emitted from regenerators of catalytic cracking units to environmentally acceptable levels. The process is also beneficial to effectively remove nitrogen oxides, sulfur oxides, and particulates from combustion gases emitted from synthetic fuel plants, such as those which retort, solvent extract, or otherwise process oil shale, tar sands, diatomaceous earth (diatomite), uintaite (gilsonite), lignite, peat, and biomass, as well as to effectively remove nitrogen oxides, sulfur oxides and particulates emitted from coal liquefaction and gasification plants. The disclosed process is also useful to clean up flue gases from power plants, paper mills, steel mills, waste (garbage) treatment sites, chimneys, smoke stacks, etc.

To this end, nitrogen oxide, sulfur oxide, and particulate-laden gases are treated and purified in a single processing vessel, preferably a granular bed filter and scrubber, located downstream of the combustor to simultaneously remove nitrogen oxides, sulfur oxides, and particulates from the gases. In the processing vessel, the particulates, nitrogen oxides, and sulfur oxides are simultaneously removed from the dusty sulfur and nitrogen oxide-containing gases by contacting the gases with a nitrogen oxide-capturing reducing agent, such as ammonia or ammonia-liberating compounds, hydrogen, carbon monoxide, and/or light hydrocarbon gases and passing the gases through at least a portion of a bed of sulfur oxide-capturing and particulate-removing material which can also promote the removal of nitrogen oxide. Desirably, the nitrogen oxide-capturing gases are fed into the vessel and passed through the portion of the bed at an angle of inclination from 30° to 90° relative to the horizontal axis of the vessel and, most preferably, vertically downwardly at right angles (perpendicular) to the horizontal axis for best results.

Nitrogen oxide-capturing reducing agents comprising light hydrocarbon gases or carbon monoxide can be diluted with steam to attain a steam shift reaction or steam reforming in order to produce hydrogen. Hydrogen produced in this manner is an effective and relatively inexpensive nitrogen oxide-capturing reducing agent.

Preferably, the bed of sulfur oxide-capturing, and particulate-removing material is a downwardly moving bed of granular material in the form of balls, spheres, pebbles, or pellets. The preferred granular material is alumina adsorbers, although adsorbers comprising one or more oxides of other metals can also be used, either alone or in combination with alumina and/or each other, such as bismuth, manganese, yttrium, antimony, tin, copper, rare earth metals, and/or metals from Group 1a or 2a of the Periodic Table.

The metal oxide can be in a substantially purified form or on a suitable support. Some suitable supports are: alumina, silica, kaolin or other clays, diatomaceous earth, boria and/or mullite. The support controls the attrition and surface area characteristics of the adsorbers.

The adsorbers can be coated with a catalyst that promotes the removal of sulfur oxides and/or nitrogen oxides. While the preferred catalyst is platinum, other catalytic metals, both free and in a combined form, preferably an oxide form, can be used, either alone or in combination with platinum and/or each other, such as rare earth metals, noble metals from Group 8 of the Periodic Table, chromium, vanadium, rhenium, tungsten, silver, and combinations thereof. The absorbers may also convert the adsorbed (removed) sulfur oxides to sulfates. The sulfates, in turn, may also serve as a catalyst in the bed to promote the removal and reduction of nitrogen oxides to molecular nitrogen.

The spent material (adsorbers) containing the captured particulates and sulfur oxides can be regenerated, such as in a lift pipe riser or transfer line, to remove the sulfur oxides and particulates from the adsorbers. The regenerated adsorbers can be recycled to the processing vessel, with or without additional scrubbing or stripping, as desired. In one form, the adsorbers are regenerated thermally, such as by combustion (hot combustion gases) or other heating means. Combustion can be enhanced with an auxiliary fuel, such as torch oil, hydrogen sulfide, and/or light hydrocarbon gases. In another form, the adsorbers are regenerated with a regenerating reducing gas to convert the sulfur oxides to hydrogen sulfide. The regenerating reducing gas can be hydrogen, ammonia, ammonia-liberating compounds, gas oils, or light hydrocarbon gases, such as methane, ethane, propane, etc., and can be diluted with steam. The hydrogen sulfide can be treated in a hydrogen sulfide treatment plant, such as an amine recovery unit and/or a Claus plant to recover the sulfur content of the SOx as elemental sulfur. The particulates in the dusty effluent gases can be removed downstream of the regenerator in one or more filters or dedusters, such as a cyclone and/or bag house.

Particulates emitted from catalytic cracking units are mainly catalyst particles. Particulates emitted from synthetic fuel plants are mainly combusted synthetic fuels (spent hydrocarbon-containing material). Particulates emitted from power plants, steel mills, waste treatment sites, etc., contain ash and/or other material.

As used in this application, the terms "sulfur oxide" and "sulfur oxides" mean sulfur dioxide and/or sulfur trioxide.

The term "SOx" as used herein means sulfur oxide.

The terms "nitrogen oxide" and "nitrogen oxides" as used herein mean nitric oxide (NO) and/or nitrogen dioxide ($NO_2$).

The term "NOx" as used herein means nitrogen oxide.

The terms "spent catalyst," "spent promoter," and "spent material" as used herein mean a catalyst, promoter, or material, respectively, which has been at least partially deactivated.

A more detailed explanation of the invention is provided in the following description and appended claims taken in conjunction with the accompanying drawings.

DETAILED DESCRIPTION OF THE PREFERRED EMBODIMENT

Figure 1:
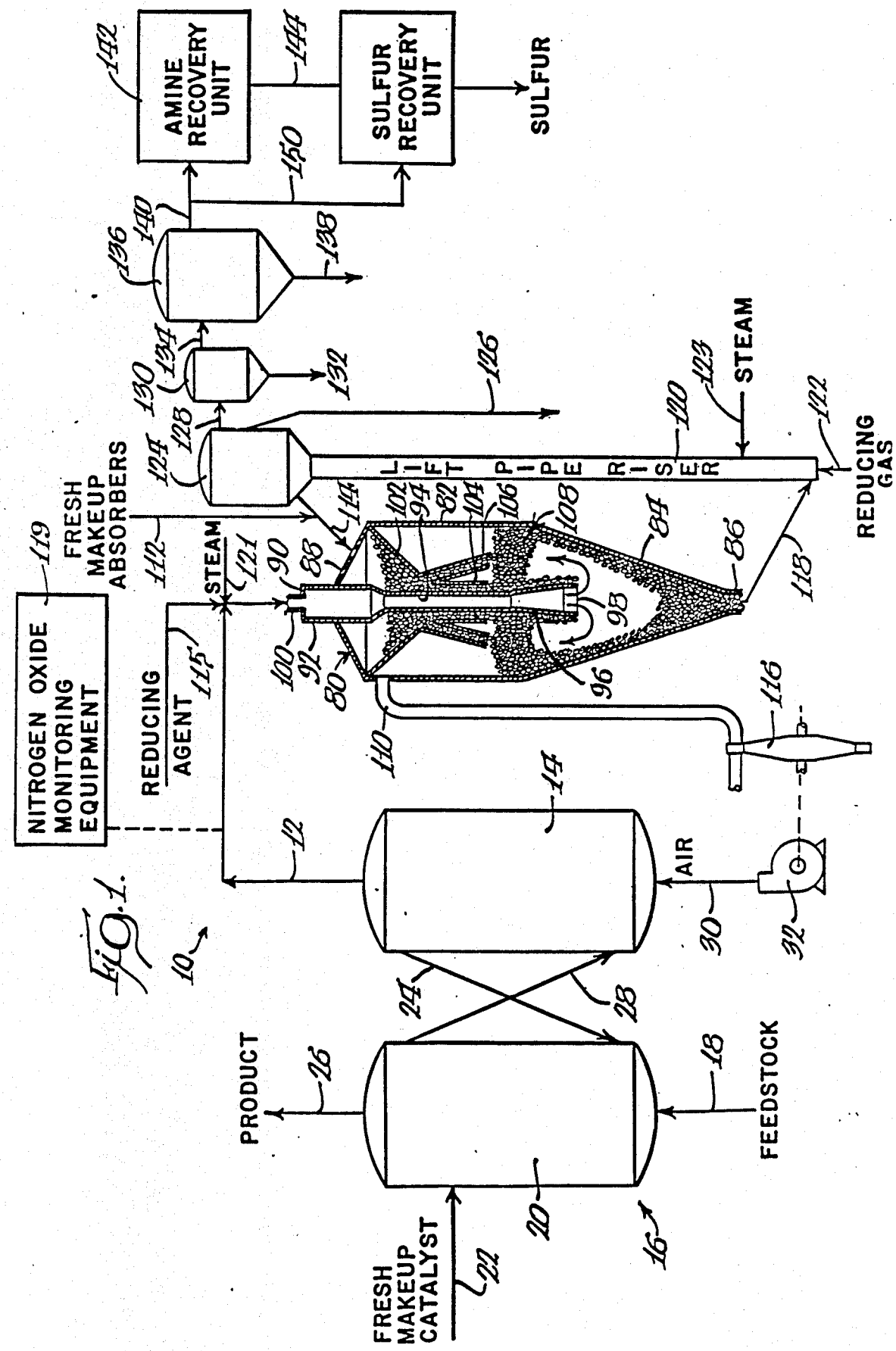
FIG. 1 is a schematic flow diagram of a gas purification process in accordance with principles of the present invention.

Referring now to FIG. 1, a gas purification process 10 is provided to remove nitrogen oxides (NOx), sulfur oxides (SOx), and particulates from a gaseous stream 12, such as flue gases, to minimize emission of pollution and contaminants into the atmosphere. While the process of the present invention is described hereinafter with particular reference to cleanup of combustion off-gases emitted from the regenerator 14 of a catalytic cracking unit 16, it will be apparent that the process of the present invention can also be used to effectively clean up combustion gases (flue gases) emitted from other combustors, such as those from synthetic fuel plants, which retort, solvent extract, or otherwise process oil shale, tar sands, diatomaceous earth (diatomite), uintaite (gilsonite), lignite, peat, and biomass, coal liquefaction and gasification plants, power plants, paper mills, steel mills, waste (garbage) treatment sites, chimneys, smoke stacks, etc.

In the gas purification process of FIG. 1, a hydrocarbon feedstock, such as gas oil, is fed through feedstock line 18 into the bottom of a catalytic cracking reactor 20, such as the reactor of a fluid catalytic cracker (FCC) unit. Fresh make-up catalytic cracking catalyst and regenerated catalytic cracking catalyst are fed into the reactor through fresh make-up catalyst line 22 and regenerated catalyst line 24, respectively. In the reactor, the hydrocarbon feedstock is vaporized upon being mixed with the hot cracking catalyst and the feedstock is catalytically cracked to more valuable, lower molecular weight hydrocarbons. The catalytically cracked hydrocarbons are withdrawn from the top of the reactor through overhead product line 26 and conveyed to downstream processing equipment (not shown) for further upgrading, separation into fractions, and/or further processing.

Spent catalyst containing deactivating deposits of coke is discharged from the reactor through spent catalyst line 28 and fed to the bottom portion of an upright, fluidized catalyst regenerator or combustor 14. The reactor and regenerator together provide the primary components of the catalytic cracking unit. Air is injected upwardly into the bottom portion of the regenerator through air injector line 30 by air pump 32. The air is injected at a pressure and flow rate to fluidize the spent catalyst particles generally upwardly within the regenerator. Residual carbon (coke) contained on the catalyst particles is substantially completely combusted in the regenerator leaving regenerated catalyst for use in the reactor. The regenerated catalyst is discharged from the regenerator through regenerated catalyst line 24 and fed to the reactor. The combustion off-gases (flue gases) are withdrawn from the top of the combustor through an overhead combustion off-gas line or flue gas line 12. The combustion off-gases or flue gases contain minute particulates of spent catalyst particles as well as sulfur oxides (SOx) and nitrogen oxides (NOx). The particulates in the combustion off-gases and flue gases emitted from the regenerator of a catalytic cracking unit are very small and typically range in size from 20 microns to less than 0.1 micron. Under present government environmental standards, the particulates, SOx, and NOx in the flue gases are pollutants which must be reduced to environmentally acceptable levels before the flue gases are vented to the atmosphere.

Figure 5:
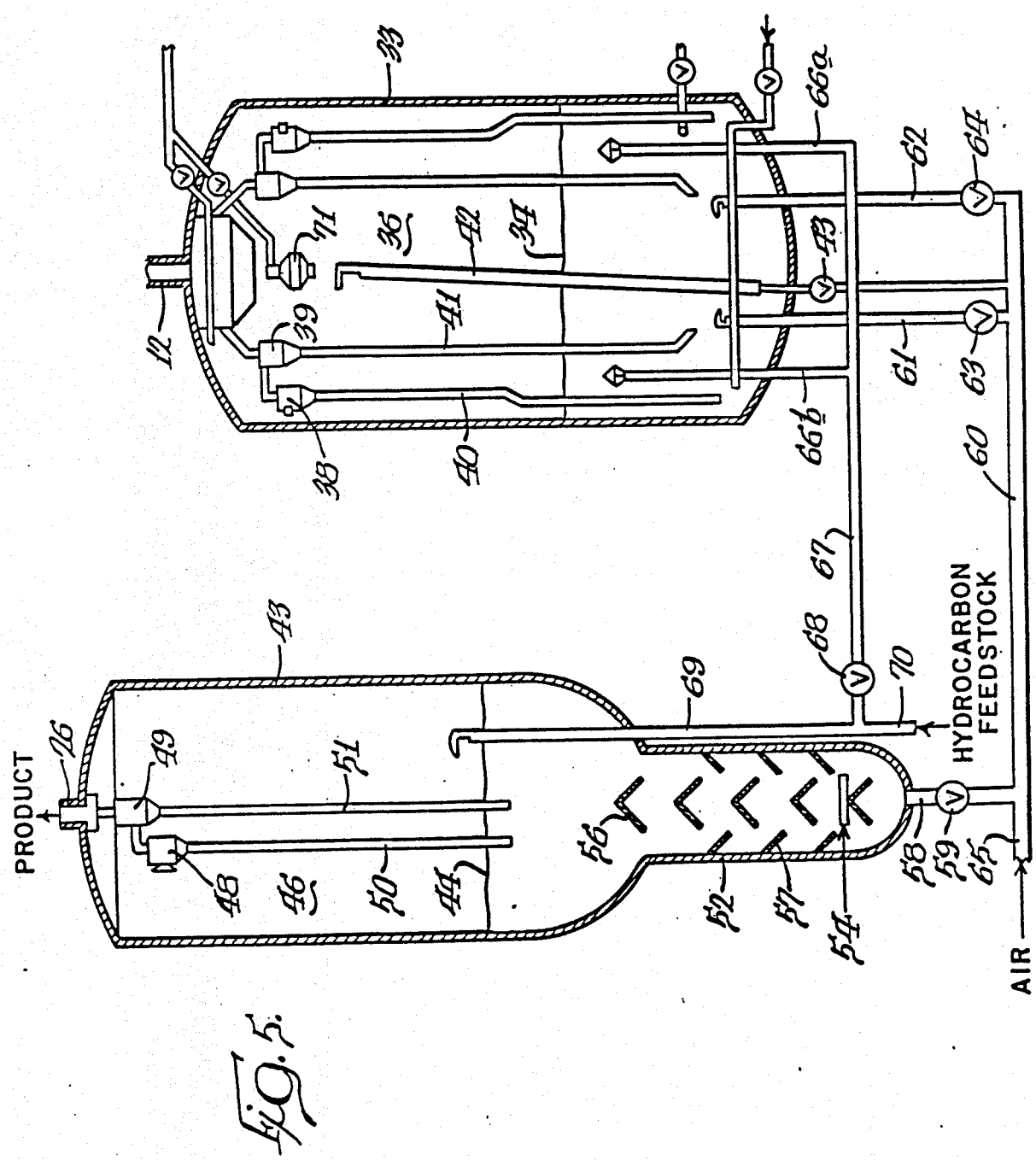
FIG. 5 is a cross-sectional view of a catalytic cracking unit.

In the regenerator 33 of FIG. 5, the regenerator has a dense phase lower section 34 and a dilute phase upper section 36 to provide for substantially complete carbon monoxide (CO) burning and combustion in the manner described by Horecky et al., U.S. Pat. No. 3,909,392, which is hereby incorporated by reference in its entirety. The regenerator can also have one or more internal cyclones 38 and 39 for removing some of the catalyst particulates from combustion gases. The removed catalyst particles are discharged through dip legs or return lines 40 and 41 at the lower end of the cyclones into the dense phase lower portion 34. If desired, the regenerator can also have an eductor or eductor tube 42 to disperse the spent cracking catalyst particles in a fountain, rain, or spouted bed into the dilute phase upper portion of the regenerator, via valve 43, with the aid of air, steam, or inert gases.

As shown in FIG. 5, the catalytic cracking reactor 43 can also have a dense phase lower portion 44 and a dilute phase upper portion 46, as well as one or more internal cyclones 48 and 49 for removing cracking catalyst particles from the gaseous product stream before the cracked product stream is removed from the reactor. Downwardly depending dip legs or return lines 50 and 51 from the internal cyclones in the reactor return the cracking catalyst particles to the lower portion of the reactor. If desired, external cyclones can be used instead of internal cyclones.

The reactor 43 can also have a steam stripping section 52 at the bottom of the reactor which is of a smaller cross-sectional area than the outer walls of the dilute and dense phase portions of the reactor. Steam is injected into the steam stripping portion 52 through steam line 54 to steam strip volatile hydrocarbons from the cracking catalyst particles. The steam also serves to fluidize the cracking catalyst in the stripping portion 52 as well as to fluidize the cracking catalyst in the lower dense phase 44 of the reactor. The steam stripping portion can have internals, such as conical baffles 56 and donuts 57, to enhance flow and steam stripping. A high temperature second stage steam stripper can also be used.

The spent catalyst can be withdrawn from the bottom of the steam stripper section through spent catalyst line 58, via control valve 59, instead of from the upper portion of the reactor, if desired, and can be transported upwardly into the lower portion of the regenerator 33 through a transfer line 60 and regenerator inlet lines 61 and 62, via inlet valves 63 and 64, with the aid of air from air injector 65. The regenerated catalyst can be withdrawn from the bottom of the regenerator 33 through regenerated catalyst lines 66a and 66b, if desired, instead of from the upper portion of the regenerator and conveyed by regenerated catalyst line 67, valve 68, and reactor inlet line 69 to the dilute phase portion 46 of the reactor 43 along with the hydrocarbon feedstock from feedstock line 70. The temperature in the regenerator can be controlled by steam pod injector 71.

Suitable hydrocarbon feedstocks for the catalytic cracking unit preferably have a boiling point above the gasoline boiling range, for example from about 400° F. to about 1,200° F., and are usually catalytically cracked at temperatures ranging from about 850° F. to about 1,200° F. Such feedstocks can include various mineral oil fractions boiling above the gasoline range, such as light gas oils, heavy gas oils, wide-cut gas oils, vacuum gas oils, kerosenes, decanted oils, residual fractions (resid), reduced crude oils, and cycle oils derived from any of these, as well as suitable fractions derived from shale oil, tar sands oil, diatomaceous earth oil, coal liquefaction, or other synthetic oils. Such fractions may be employed singly or in any desired combination.

Catalytic cracking of heavy mineral oil fractions is an important refining operation in the conversion of crude oils to desirable fuel products, such as high-octane gasoline fuel used in spark-ignited, internal combustion engines. In fluid catalytic cracking, high molecular weight hydrocarbon liquids or vapors are contacted with hot, finely-divided solid catalyst particles in a fluidized bed reactor such as shown in FIG. 1 or in an elongated riser reactor, such as shown in FIG. 5, and the catalyst-hydrocarbon mixtures are maintained at an elevated temperature in a fluidized or dispersed state for a sufficient period of time to obtain the desired degree of cracking to the lower molecular weight hydrocarbons typically present in motor gasoline and distillate fuels.

In usual cases where riser cracking is employed for conversion of a gas oil, the throughput ratio, or volume of total feed to fresh feed, may vary from about 1 to 3. The conversion level may vary from about 40 to about 100 weight percent and advantageously is maintained above about 60 weight percent, for example, between about 60 and 90 weight percent. The term "conversion" is generally used herein as the percentage reduction by weight of hydrocarbons boiling above about 430° F. at atmospheric pressure by the formation of lighter materials or coke.

The weight ratio of total cracking catalyst-to-oil in the riser reactor of a catalytic cracking unit can vary within the range of from about 2 to about 20 in order that the fluidized dispersion will have a density within the range of from about 1 to about 20 pounds per cubic foot. Desirably, the catalyst-to-oil ratio is maintained within the range of from about 3 to about 20, preferably 3 to about 7 for best results. The fluidizing velocity in the riser reactor can range from about 10 to about 100 feet per second. The riser reactor can have a ratio of length-to-average diameter of about 25.

For production of a typical naphtha product, the bottom section mixing temperature within the catalytic cracking riser reactor is advantageously maintained at about 1,000° F. to about 1,100° F. for vaporization of the oil feed so that the top section's product exit temperature will be about 950° F. For cracking resids and synthetic fuels, substantially higher mixing temperatures in the bottom section of the reactor, such as about 2,000° F., are usually necessary for effective cracking.

Under the above conditions, including provision for a rapid separation of spent catalyst from effluent oil vapor, a very short period of contact between the cracking catalyst and oil will be established. Contact time within the catalytic cracking riser reactor will generally be within the range of from about 1 to about 15 seconds, preferably within the range of from about 3 to about 10 seconds. Short contact times are preferred because most of the hydrocarbon cracking occurs during the initial increment of contact time and undesirable secondary reactions are avoided. This is especially important if higher product yield and selectivity, including lesser coke production, are to be realized.

Short contact time between cracking catalyst particles and oil vapors can be achieved by various means. For example, cracking catalyst may be injected at one or more points along the length of a lower, or bottom, section of the riser reactor. Similarly, oil feed may be injected at all the points along the length of the lower section of the riser reactor and a different injection point may be employed for fresh and recycle feed streams. Auxiliary nozzles can also be used to disperse resids or other feedstock onto the catalyst for more efficient catalytic cracking reactions. The lower section of the riser reactor above the stripping section may, for this purpose, include up to about 80 percent of the total riser length in order to provide extremely short effective contact times inducive to optimum conversion of petroleum feeds. The reactor is preferably designed to minimize cracking of the product in the dilute phase. Where a dense catalyst bed is employed, provision may also be made for injection of cracking catalyst particles and/or oil feed directly into the dense-bed zone.

While the conversion conditions specified above are directed to the production of gasoline as fuel for spark-ignition internal combustion engines, the process may be suitably varied to permit maximum production of heavier hydrocarbon products such as jet fuel, diesel fuel, heating oil and chemicals and, in particular, olefins and aromatics.

In catalytic cracking, some non-volatile carbonaceous material, or "coke", is deposited on the catalyst particles. Coke comprises highly condensed aromatic hydrocarbons which generally contain a minor amount of hydrogen, such as from about 4 to about 10 weight percent. When the hydrocarbon feedstock contains organic sulfur compounds and organic nitrogen compounds, the coke also contains sulfur and nitrogen. As coke builds up on the catalyst, the activity of the catalyst for cracking and the selectivity of the catalyst for producing gasoline blending stocks diminish. The catalyst particles may recover a major proportion of their original capabilities by removal of most of the coke therefrom in the catalyst regenerator.

The spent catalyst from the petroleum conversion reaction in the reactor is preferably stripped in the steam stripping section 52 (FIG. 5) prior to entering the regenerator. The stripping section for use in the fluidized bed catalytic cracker can be maintained essentially at a conversion reactor temperature in the range of from about 200° to about 1,200° F. and preferably above about 870° F. for best results. The preferred stripping gas is steam although steam containing a diluent, such as nitrogen or some other inert gas or flue gas, may also be employed. The stripping gas can be injected into the stripping section at a pressure of at least about 10 psig, preferably about 35 psig, to attain substantially complete removal of volatile compounds from the spent conversion catalyst. If desired, an inert stripping gas can be used instead of steam.

Catalyst regeneration is accomplished by burning the coke deposits from the catalyst surface with a molecular oxygen-containing gas, such as air. The oxidation of coke may be characterized in a simplified manner as the oxidation of carbon as shown below.

$$C + O_2 \rightarrow CO_2 \tag{a}$$

$$2C + O_2 \rightarrow 2CO \tag{b}$$

$$2CO + O_2 \rightarrow 2CO_2 \tag{c}$$

Reactions (a) and (b) both can occur under typical catalyst regeneration conditions with the catalyst temperature ranging from about 1,050° F. to about 1,450° F. or higher and are exemplary of gas-solid chemical interactions. The effect of any increase in temperature is reflected in an increased rate of combustion of carbon and a more complete removal of carbon, or coke, from the catalyst particles. The gas-phase reaction (c) may also occur. This latter reaction is initiated and propagated by free radicals and can be catalyzed, for example, by platinum group metals.

The burning of sulfur-containing and nitrogen-containing coke deposits from the catalyst also results in the formation of sulfur oxides and nitrogen oxides, and, although the disclosed invention is not to be limited thereby, the sulfur-compound and sulfur oxide burning may be represented by the following chemical equations:

$$S \text{ (in coke)} + O_2 \rightarrow SO_2 \tag{d}$$

$$2SO_2 + O_2 \rightarrow 2SO_3 \tag{e}$$

Reactions (d) and (e) also occur under typical cracking catalyst regeneration conditions. While reaction (d) is fast, reaction (e) is relatively slow. Reaction (e) can be catalyzed by essentially any catalyst which catalyzes reaction (c) above.

Stripped deactivated cracking catalyst is regenerated by burning the coke deposits from the catalyst surface with air or some other combustion-sustaining molecular oxygen-containing regeneration gas in a regenerator. This burning results in the formation of combustion products such as sulfur oxides, carbon monoxide, carbon dioxide, and steam. The oxygen-containing regeneration gas can contain a diluent, such as nitrogen, steam, carbon dioxide, recycled regenerator effluent gases, and the like. The molecular oxygen concentration of the regeneration gas is ordinarily from about 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range from about 1,049° F. to about 1,454° F. and are preferably in the range from about 1,148° F. to about 1,355° F. Other regeneration temperatures may be used in some circumstances. When air is used as the regeneration gas, it can be injected into the bottom of the regenerator from a blower or compressor at a fluidizing velocity in the range from about 0.15 to about 5 feet per second and preferably from about 0.5 to about 3 feet per second.

Suitable cracking catalysts include, but are not limited to, those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves, in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results.

The crystalline aluminosilicates are usually available or made in sodium form and this component is preferably reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earths metals such as cerium, lanthanum, neodymium, and/or naturally-occurring mixtures of the rare earth metals. Such crystalline materials are able to maintain their pore structure under the high temperature conditions of catalyst manufacture, hydrocarbon processing and catalyst regeneration. The crystalline aluminosilicates often have a uniform pore structure of exceedingly small size with the cross-sectional diameter of the pores being in a size range of about 6 to 20 angstroms, preferably about 10 to 15 angstroms. Silica-alumina based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used.

The cracking catalyst particles are finely-divided and can have an average particle size in the range of about 150 microns to about 20 microns or less.

The regeneration gas serving to fluidize the dense bed contains free or molecular oxygen and the oxygen is preferably charged to the regenerator in an amount somewhat in excess of that required for complete combustion of coke (carbon and hydrogen) to carbon dioxide and steam. The amount of oxygen in excess of that required for complete combustion of the coke may vary from about 0.1 to about 35 or more percent of the stoichiometric oxygen requirement for complete combustion of the coke but, advantageously, need not be greater than about 10 percent. For example, when air is employed as the regeneration gas, a 10 percent excess of air provides only about 2 volume percent oxygen in the effluent spent gas stream. Advantageously, the concentration of molecular or free oxygen and carbon monoxide at any point within the regenerator is maintained outside of the explosive range at those conditions to eliminate any risk of detonation.

An oxidation-promoting, carbon monoxide-burning catalyst can be fed to the regenerator to promote complete burning of carbon monoxide to carbon dioxide in the regenerator. The solid oxidation catalyst can be in a finely-divided form, such as powder, separate from the hydrocarbon cracking catalyst, or can be supported on another substrate and admixed with the cracking catalyst. The support for the oxidation catalyst can be less catalytically active, or even inert, to the oxidation and hydrocarbon conversion reactions. Desirably, the support is porous. The support can have a surface area, including the area of the pores on the surface, of at least about 10, preferably at least about 50, square meters per gram. Illustrative of the supports, which can be essentially amorphous, are silica, alumina, silica-alumina, and the like. Platinum group metals or rheniun can be used as can other oxidation catalysts that promote the oxidation of carbon monoxide in the presence of molecular oxygen. These oxidation catalysts comprise a catalytic metal which promotes the oxidation. The metal can be in a combined form, such as an oxide, rather thar being in the elemental state. The oxidation catalysts can be rhenium or a platinum group metal from Group 8 of the Periodic Table, such as platinum, palladium and rhodium. The solid oxidation catalyst can comprise two or more catalytically-active metals either physically or chemically combined. By a chemical combination of metals, there are included bi- or poly-metallic salts or oxides. Illustrative of combinations of catalytically-active metals which may promote oxidation of carbon monoxide without unduly adversely affecting the hydrocarbon cracking operations are combinations of the platinum group metals, and/or rhenium, iron, and the like, either in a free or combined form, preferably an oxide form. Other metals can be used.

The substrate for the solid oxidation-promoting carbon monoxide-burning catalyst can be a portion of the cracking catalyst or can be different therefrom. For example, it can be a non-catalytic, porous, solid substrate. When the hydrocarbon cracking catalyst serves as the substrate, care should be taken in selection of the deposition process such that the cracking activity and selectivity of the catalyst is not adversely affected. It is preferred that if the hydrocarbon cracking catalyst is of the type having ion-exchanged sites, the ion-exchange be completed prior to deposition of the oxidation catalyst. The amount of oxidation-promoting metal employed for promotion of the oxidation of carbon monoxide can be in a minor amount effective to enhance the desired oxidation. This amount can be very small, e.g., as little as about 0.01 part per million or less based on the weight of the hydrocarbon cracking catalyst employed. The amount of oxidation-promoting metal can often be at least about 0.1 ppm up to about 5 or about 10 ppm. Larger amounts of the oxidation-promoting metal, such as about 0.01 to 5, or about 0.05 to 1, percent by weight based on the hydrocarbon cracking catalyst, can be employed.

In order to remove nitrogen oxides, sulfur oxides and particulates from the regenerator/combustion off-gases (flue gases), the nitrogen oxide, sulfur oxide, and particulate-laden gases are passed through a granular bed filter and scrubber 80 (FIG. 1), either directly or indirectly, after passing through one or more cyclones to remove some of the large gross particulates. The granular bed filter and scrubber is an elongated, upright single, nitrogen oxide-capturing, sulfur oxide-capturing, and particulate-removing vessel which filters particulates and scrubs nitrogen oxides and sulfur oxides from the influent flue gases. The granular bed filter and scrubber has an exterior vertical sidewall 82 with a circular cross-section, an elongated frustro-conical bottom section or portion 84 whose flared sidewalls converge downwardly and terminate into an outlet or discharge mouth 86 along the vertical axis of the granular bed filter and scrubber, and an upwardly converging roof or top 88.

The granular bed filter and scrubber has a vertical conduit or pipe 90 which provides a gas inlet line. The conduit extends vertically downwardly through the roof along the vertical axis of the filter and scrubber to a discharge position in the upper portion of the interior of the frustro-conical bottom section. The vertical conduit has an enlarged head 92 at its upstream end which extends upwardly through the roof, an elongated main body 94 which has a smaller cross-section than the head and is circumferentially surrounded by the sidewall 82, and has an outwardly flared discharge portion 96 at its downstream end with downwardly converging frustro-conical walls which terminate in a gas outlet and discharge mouth 98. The upstream head of the conduit preferably has a vertical inlet mouth 100, although in some circumstances it may be desirable to have a horizontal inlet mouth.

Extending downwardly from the roof within the interior of the filter and scrubber is an annular frustro-conical, adsorber collection reservoir or ball hopper 102 whose flared sidewalls converge downwardly and surround the upper portion of the vertical conduit. Discharge chutes or outlet pipes 104 and 106 extend generally downwardly from the reservoir into or slightly above a downwardly-moving bed 108 of sulfur oxide-capturing and particulate-removing material. The chutes can include a centrally-disposed vertical discharge chute 104 that circumferentially and concentrically surrounds a portion of the main body section 94 of the vertical conduit and symmetrical, outwardly inclined, angular chutes 106 which extend downwardly and outwardly at an angle of inclination relative to the vertical axis of the filter and scrubber. Extending outwardly from the sides of the filter and scrubber is a gas outlet line 110. A regenerated adsorber-inlet line 114 extends generally downwardly at an angle of inclination through the roof of the scrubber and filter.

In the preferred embodiment, the bottom frustro-conical section 84 of the granular bed filter and scrubber is filled with a downwardly moving bed 108 of sulfur oxide-capturing and particulate-removing granular material which is in the form of balls, pebbles, spheres, or pellets. The sulfur oxide-capturing and particulate-removing material provides adsorbers or acceptors which adsorb, collect, and/or otherwise remove sulfur oxides and particulates from the influent gaseous stream (regenerator flue gases). In the most preferred embodiment, the bed of granular material is a bed of sulfur oxide-capturing and particulate-removing material, which serves as sulfur dioxide and particulate adsorbers or acceptors, and also serves to promote the removal of nitrogen oxides. The adsorbers enter the granular bed filter and scrubber through fresh make-up adsorber line 112 or regenerated adsorber line 114 and descend by gravity flow into the frustro-conical adsorber reservoir 102. The adsorbers are discharged downwardly from the reservoir through the downwardly extending chutes into the downwardly moving bed.

The adsorbers preferably comprise substantially alumina, and most preferably alumina compounded with magnesia, for best results. Gamma ($\gamma$) alumina, chi-eta-rho ($\chi$, $\eta$, $\rho$) alumina, delta ($\delta$) alumina, and theta ($\theta$) alumina are particularly useful as adsorbers and supports because of their high surface areas. While alpha ($\alpha$) alumina and beta ($\beta$) alumina can be used as adsorbers, they are not as effective as gamma, chi-eta-rho, delta, and theta alumina. One or more oxides of other metals can also be used as adsorbers, either alone or in combination with alumina or as spinels, such as bismuth, manganese, yttrium, antimony, tin, copper, Group 1a metals, Group 2a metals, rare earth metals, and combinations thereof. Magnesium aluminate spinels are particularly useful as adsorbers. Lanthanum and cerium are preferred earth metals. Naturally occurring rare earths, such as in the form of baestenite, are also useful adsorbers. Elemental copper or copper compound adsorbers, such as copper oxide adsorbers, can also be used. The copper oxide can be cuprous oxide ($Cu_2O$) and/or cupric oxide ($CuO$). Other copper compounds can be used, such as copper (II) sulfate, copper (II) acetate, copper (II) formate, copper (II) nitrate and/or copper (II) chloride. The adsorbers can also be a blend/mixture of high density and low density materials, such as of the above-identified metal oxides.

The metal or metal oxide part of the adsorbers can be supported, carried, and held on a refractory support or carrier material which also provides part of the adsorbers. The support controls the attrition and surface area characteristics of the adsorbers. The support preferably has a surface area greater than about 10 $m^2/g$ and most preferably from about 50 $m^2/g$ to about 500 $m^2/g$ for best results. Suitable supports include, but are not limited to, silica, alumina, kaolin or other clays, diatomaceous earth, boria, and/or mullite. The support can comprise the same material as the metal or metal oxide part of the adsorbers.

The adsorbers can be impregnated or otherwise coated with an oxidizing catalyst or promoter that promotes the removal of sulfur oxides and/or nitrogen oxides. One useful catalyst is ceria (cerium oxide). Another useful catalyst is platinum. Other catalytic metals, both free and in a combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver, and combinations thereof. The promoter can comprise the same material as the adsorber. An even distribution of the promoter is preferred for best results and to minimize adsorber erosion.

The Group 1a metals, Group 2a metals, and Group 8 metals referred to are those listed in the Periodic Table of the Elements in the *Handbook of Chemistry and Physics* (54th Edition). Useful Group 1a metals include lithium, sodium, potassium, rubidium, and cesium. Useful Group 2a metals include magnesium, calcium, strontium, and barium. Useful Group 8 metals are the Group 8 noble metals (the platinum family of metals) including ruthenium, rhodium, palladium, osmium, iridium, and platinum. The rare earth metals are also useful and are referred to as the lanthanides. Suitable rare earth metals include cerium, praeseodymium, neodymium, samarium, europium, gadolinium, terbium, dysprosium, holmium, erbium, thulium, ytterbium, and lutetium.

In order to remove the nitrogen oxides, sulfur oxides, and particulates from the influent regeneration off-gases (flue gases), the adsorption temperature of the granular bed filter and scrubber should be between 200° F. and 1,600° F. The adsorption temperature as used herein is the temperature at which the granular bed filter and scrubber should be operated, including the temperatures of the influent flue gases, reducing agent gases, and bed of adsorbers, to effectively remove, adsorb, and/or capture the nitrogen oxides (NOx), sulfur oxides (SOx), and particulates from the flue gases. Physical non-oxidative adsorption of the NOx, SOx, and particulates can occur between 200° F. and 800° F. and preferably at least 600° F. for best results. Chemical oxidative adsorption of the NOx, SOx, and particulates can occur between 800° F. and 1,600° F., preferably between 1,000° F. and 1,400° F., and most preferably between 1,200° F. to 1,300° F. for best results. During chemical adsorption, some or all of the removed sulfur oxides are converted to sulfates. The sulfate deposits on the bed also serve as a catalyst to promote the removal of nitrogen oxides (NOx) from the flue gases.

A reducing agent gas injector or reducing gas line 115 injects a nitrogen oxide-capturing reducing agent or gas into the granular bed filter and scrubber. In the preferred embodiment, both the nitrogen oxide-capturing reducing agent and the regenerator/combustion off-gases (flue gases) are injected vertically downwardly through a unitary common, combined feed line 117 into the vertical inlet mouth 100 of the granular bed filter and scrubber's vertical conduit 90 for best results. In some circumstances, however, it may be desirable to inject the nitrogen oxide-capturing reducing agent and flue gases separately into the vertical inlet mouth or a horizontal inlet mouth of the vertical conduit, without the benefit of a unitary common feed line, or through separate inlet ports in the vertical conduit. Furthermore, in some circumstances it may be desirable to inject the nitrogen oxide-capturing reducing agent into the granular bed filter and scrubber through another inlet opening, port, or pipe that is separated and spaced away from the vertical conduit.

The nitrogen oxide-capturing reducing agent or reducing gas serves to remove, capture, and/or adsorb the nitrogen oxides (NOx) in the regenerator/combustor off-gases (flue gases) and convert the nitrogen oxides to molecular nitrogen ($N_2$) and steam and/or carbon dioxide. The nitrogen oxide-capturing reducing agent or gas can be hydrogen, ammonia, ammonia-liberating compounds, carbon monoxide, and/or light hydrocarbon gases, such as methane, ethane, propane, etc. Useful ammonia-liberating compounds include: ammonium carbonate, ammonium formate, ammonium oxylate, and ammonium citrate. Other reducing agents that remove nitrogen oxides and convert nitrogen oxides to nitrogen and steam (water) and/or carbon dioxide can also be used. The nitrogen oxide-capturing reducing agent can be obtained from a fractionator, hydrotreater, or other refinery equipment.

Nitrogen oxide-capturing reducing agents comprising light hydrocarbon gases and/or carbon monoxide can also be diluted with steam to attain a steam shift reaction or steam reforming in order to produce hydrogen and carbon monoxide. The steam can be injected into the reducing agent line 115 or the common line 117 through steam injector 121. Alternatively, steam can be injected into the flue gas line 12 or fed separately into the granular bed filter and scrubber by a steam injector line. Hydrogen produced by a steam shift reaction or steam reforming serves as an effective and relatively inexpensive nitrogen oxide-capturing reducing agent to convert nitrogen oxides to nitrogen and steam.

Although the present invention is not to be so limited, it is believed that the ammonia converts the nitrogen oxides to molecular nitrogen and steam as follows:

$$6NO_2 + 8NH_3 \rightarrow 7N_2 + 12H_2O$$

$$6NO + 4NH_3 \rightarrow 5N_2 + 6H_2O$$

Although the present invention is not to be so limited, it is believed that the methane converts nitrogen oxides to molecular nitrogen, steam, and carbon dioxide as follows:

$$CH_4 + 2NO_2 \rightarrow N_2 + 2H_2O + CO_2$$

$$CH_4 + 4NO \rightarrow 2N_2 + 2H_2O + CO_2$$

Although the present invention is not to be so limited, it is believed that carbon monoxide converts nitrogen oxides to molecular nitrogen and carbon dioxide as follows:

$$2CO + 2NO \rightarrow N_2 + 2CO_2$$

$$4CO + 2NO_2 \rightarrow N_2 + 4CO_2$$

The amount (quantity) and proportion of nitrogen oxides (NOx), nitrogen dioxide ($NO_2$), and nitric oxide (NO) in the influent regenerator/combustor off-gases (flue gases) can be monitored and determined by nitrogen oxide, nitrogen dioxide, and nitric oxide analyzers, meters, or monitoring equipment 119, such as a chemiluminscence nitrogen oxide analyzer produced by Beckman Instruments, Model 952, or a coulometer.

The inlet feed rate of the nitrogen oxide-capturing reducing agent is preferably dependent and directly proportional to the NOx, $NO_2$, and NO concentrations in the regenerator/combustor off-gases (flue gases). Desirably, the mole feed ratio of ammonia (reducing agent) to nitric oxide (NO), in the inlet (influent) flue gases should range from 0.1:1 to 1.5:1 and most preferably from 0.5:1 to 1:1 for best results. The mole feed ratio of ammonia (reducing agent) to nitrogen dioxide ($NO_2$) in the inlet flue gases should range from 0.1:1 to 3:1 and most preferably from 1:1 to 2:1 for best results.

The mole feed ratio of molecular hydrogen ($H_2$) (reducing agent) to nitric oxide (NO) in the inlet (influent) flue gases should range from 0.1:1 to 2.25:1 and preferably from 0.5:1 to 1.5:1 for best results. The mole feed ratio of molecular hydrogen (reducing agent) to nitrogen dioxide ($NO_2$) should range from 0.1:1 to 4.5:1 and preferably from 1:1 to 3:1 for best results.

The mole feed ratio of methane ($CH_4$) (reducing agent) to nitric oxide (NO) in the inlet (influent) flue gases should range from 0.05:1 to 0.6:1 and preferably from 0.1:1 to 0.4:1 for best results. The mole feed ratio of methane (reducing agent) to nitrogen dioxide in the inlet flue gases should range from 0.05:1 to 1.2:1 and preferably from 0.2:1 to 0.8:1 for best results.

The mole feed ratio of carbon monoxide (CO) (reducing agent) to nitric oxide (NO) in the inlet (influent) flue gases should be 0.1:1 to 2.25:1 and preferably from 0.5:1 to 1.5:1 for best results. The mole feed ratio of carbon monoxide (reducing agent) to nitrogen dioxide ($NO_2$) in the inlet flue gases should be 0.1:1 to 4.5:1 and preferably from 1:1 to 3:1 for best results.

It will be appreciated that lesser amounts of nitrogen oxide-capturing reducing agent gases can be fed into the granular bed filter and scrubber, if desired, but with lesser efficiency and/or effectiveness in removing and converting nitrogen oxides to molecular nitrogen and steam. Greater amounts of nitrogen oxide-capturing reducing agents can also be used, but it is less economical and may cause other problems.

In operation, the regenerator off-gases (flue gases) in gas line 12 and the reducing agent (gases) in line 115 pass into vertical conduit 90, via line 117 and inlet mouth 100, and flow vertically downwardly along and about the vertical axis of the granular bed filter and scrubber until being discharged from the outlet mouth 98 of the conduit into the bed of sulfur oxide-capturing, and particulate-removing material (adsorbers). Depending on the velocity and pressure of the flue gases, the gaseous stream (flue gases) will pass downwardly through a portion of the bed before circulating upwardly. The adsorbers serve to scrub, filter, adsorb, capture, or otherwise remove the particulates and sulfur oxides (SOx) from the flue gases. The adsorbers may also convert the sulfur oxides to sulfates. The reducing agent and the sulfates (converted sulfur oxides) deposited on the adsorbers serve to scrub, adsorb, and/or capture the nitrogen oxides (NOx) and convert the nitrogen oxides to molecular nitrogen and often steam. The cleansed, purified flue gases containing the liberated molecular nitrogen, and perhaps steam, are withdrawn from the granular bed filter and scrubber through the inlet mouth of the gas outlet line 110, located above the bed where the purified flue gases can be safely vented to the atmosphere, separated into fractions, such as a steam fraction, and/or conveyed, expanded, and fed to a power recovery turbine 116 in order to drive and propel the turbine blades. The turbine can be connected to drive the air blower or pump 32.

In use, the granular bed filter has a highly concentrated collection zone at the exit (mouth) of the vertical conduit where downwardly flowing flue gas enters the bed of adsorbers, along with a downstream counterflow collection region which substantially assures that cleansed (purified) flue gas always exits upwardly through the downwardly moving bed of adsorbers.

Copper-containing adsorbers can also be used, such as copper adsorbers and/or copper oxide adsorbers. The copper oxide adsorber can be cuprous oxide ($Cu_2O$) adsorbers and/or cupric oxide (CuO) adsorbers. Adsorbers which comprise cupric oxide (CuO) are the preferred copper-containing adsorbers. In order to permit capture of sulfur oxides (SOx) by the copper-containing adsorbers, the maximum critical adsorption temperature should be 1,544° F. Desirably, the adsorption temperature for copper-containing adsorbers is at least 1,100° F. and preferably from 1,450° F. to 1,500° F. for enhanced efficiency. Although the invention is not to be so limited, it is believed that copper oxide adsorbers capture and convert sulfur oxides to copper (II) sulfate in accordance with the following reactions:

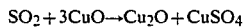

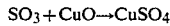

The amount of sulfur dioxide ($SO_2$) adsorbed on a platinum catalyst/promoter, such as a 2 ppm platinum catalyst on an alumina adsorber, depends on the amount of catalyst used (space velocity) as well as the temperature at which the adsorption is carried out. The amount of sulfur dioxide adsorbed, measured as breakthrough time, is greatest at either low temperatures of about 500° F. or high temperatures of about 1,200° F. to about 1,400° F. Sulfur dioxide adsorption will occur at intermediate temperatures ranging from 800° F. to 1,100° F. at an acceptable, but lesser, efficiency. Some sulfur dioxide adsorption may occur at a temperature as low as 200° F. and as high as 1,600° F. in the granular bed filter and scrubber.

The spent adsorbers containing or coated with the removed particulates and sulfur oxides and/or sulfates are discharged through spent adsorber outlet 86 and conveyed by gravity flow through spent adsorber line 118 to the bottom of a spent adsorber regenerator comprising a lift pipe riser 120 or transfer line. The spent adsorbers can be continuously discharged from the bottom of the granular bed filter and scrubber and conveyed to the regenerator lift pipe where they are regenerated, scrubbed, and/or cleansed before being recycled back to the granular bed filter and scrubber. To this end, a regenerating reducing gas (reduction gas) or a regenerating reducing agent, such as hydrogen, ammonia, ammonia-liberating compounds, carbon monoxide, gas oils, or light hydrocarbon gases, such as methane, ethane, propane, etc., is injected upwardly into the lift pipe riser by gas injector 122. Regenerating reducing gases comprising light hydrocarbon gases and/or carbon monoxide can also be diluted with steam to attain a steam shift reaction or steam reforming in order to produce hydrogen and carbon monoxide. The steam can be injected into the lift pipe riser (1) alone with and as part of the regenerating reducing gas, or (2) through a separate steam injector 123. The regenerating reducing gas is injected upwardly at a sufficient velocity and pressure to propel, carry, transport, and convey the adsorbers upwardly through the lift pipe riser into an overhead collection vessel 124. In the lift pipe riser, regenerating reducing gases comprising hydrogen, ammonia, ammonia-liberating compounds, gas oils, and/or light hydrocarbon gases react with the spent adsorbers and simultaneously removes the particulates and sulfur oxides (SOx) and/or sulfates while converting the sulfur oxides and/or sulfates to hydrogen sulfide ($H_2S$) Hydrogen produced by a steam shift reaction or steam reforming serves as an effective and relatively inexpensive regenerating reducing gas to convert sulfur oxides to hydrogen sulfides. The regenerated, cleansed adsorbers are recycled and conveyed directly from the overhead vessel 124 of the spent adsorber regenerator by gravity through regenerated adsorber line 114 into the granular bed filter and scrubber without substantially further heating, cooling, or tempering the regenerated adsorbers. Excess regenerated adsorbers can be removed from the system through overflow line 126 and discarded or stored in a hopper.

Methane can be an even more economical reductant or regenerating reducing gas in the lift pipe riser under certain conditions than hydrogen. When using methane in the lift pipe riser, the reduction duration influences the sulfur dioxide ($SO_2$) pick-up capacity (regeneration) of the spent alumina adsorbers. At a reduction temperature of 1,200° F. in the lift pipe riser, relatively short methane contact times of about 5 seconds are more effective towards restoring sulfur dioxide ($SO_2$) pick-up capacity (regeneration) of alumina adsorbers circulated in the granular bed filter and adsorber at a 1,300° F. adsorption temperature than longer methane contact times of from 30 to 45 seconds. When the reduction temperature in the lift pipe riser is increased to at least 1,300° F., the effect of methane contact time duration is negligible.

The effluent spent regenerating reducing gas, which contains the removed particulates, sulfur dioxide, and/or hydrogen sulfide, is withdrawn from the overhead vessel 124 through gas outlet line 128 where it can be passed through one or more cyclones 130 in order to remove most of the particulates via particulate discharge line 132. The filtered gases exit the cyclone through gas line 134 where they can be fed to a bag house 136 to remove most of the remaining particulates through particulate line 138. The filtered gases exit the bag house through gas line 140 where they are passed to an amine recovery unit 142 to concentrate the hydrogen sulfide. Hydrogen sulfide from the vapor recovery and upgrading unit (not shown) downstream of the catalytic cracking reactor, can also be fed to the amine recovery unit. The concentrated hydrogen sulfide is passed from the amine recovery unit through concentrated hydrogen sulfide line 144 to a sulfur recovery unit 146, such as a Claus plant, to recover elemental sulfur through sulfur recovery line 148. The recovered sulfur can be safely stacked in piles or transported elsewhere for other uses. If the level of hydrogen sulfide ($H_2S$) in the filtered spent reducing gas in line 140 is sufficiently concentrated, the filtered gases can be sent directly to the sulfur recovery unit 146 via bypass line 150, bypassing the amine recovery unit. Furthermore, if the filtered gases contain sulfur dioxide, it is preferred to feed the gases directly to the sulfur recovery unit (Claus plant) via bypass line 150 with hydrogen sulfide from the vapor recovery and upgrading unit downstream of the spent cracking catalyst regenerator or else remove the sulfur dioxide from the gases before the gases are fed to an amine recovery unit since irreversible sulfur dioxide reactions may be formed in the amine recovery unit.

In the preferred embodiment, in order to effectively and efficiently remove the particulates and sulfur oxides (SOx) from the regenerator/combustion off-gases (flue gases), the off-gases should enter the granular bed filter and scrubber at a temperature ranging from 200° F. to 1,800° F. and most preferably from 500° F. to 1,400° F., at a pressure from atmospheric pressure to 500 psia. For best results, the granular bed filter and scrubber should be operated at a temperature ranging from 200° F. to 1,600° F., preferably from 1,000° F. to 1,400° F., and most preferably from about 1,300° F. to about 1,350° F., at a pressure from 14 psia to 300 psia and preferably from atmospheric pressure to 150 psia. The maximum design operating temperature of the granular bed filter is typically about 2,000° F. The granular bed filter and scrubber has an efficiency ranging from 85% to 100% and preferably greater than 95%.

The solids flux flow rate of the adsorbers fed into the granular bed filter and scrubber is from 10 to 2,000 lbs/ft$^2$ hr, and preferably between 20 and 200 lbs/ft$^2$ hr for best results. The adsorbers are fed into the granular bed filter at a temperature ranging from 200° F. to 1,800° F. and preferably from 500° F. to 1,400° F., at a pressure ranging from 15 to 300 psia and preferably from atmospheric pressure to 150 psia. The adsorbers range in diameter (size) from 1 mm to 13 mm and preferably from 2 mm to 5 mm for best results. Adsorbers ranging in size from 2 to 5 mm are not only effective in removing particulates but provide excess capacity to adsorb sulfur oxides (SOx) and therefore provide a comfortable margin of safety to minimize downtime resulting from attrition or replacement of adsorbers. Only a small fraction of alumina adsorbers, typically less than 1% by weight, is utilized for sulfur dioxide ($SO_2$) capture. The low utilization of the alumina adsorbers avoids the problem of alumina integrity. Integrity problems arise when about 30% or more of the alumina adsorbers are used for sulfur dioxide ($SO_2$) capture in the presence of large amounts of steam.

The feed ratio (space velocity) of the sulfur oxide-removing catalyst/promoter per lbs/min sulfur dioxide ($SO_2$) in the regenerator off-gases (flue gases) per lb of adsorber is from about $1 \times 10^{-3}$ to about $1 \times 10^{-5}$ and most preferably from about $2 \times 10^{-4}$ to about $4 \times 10^{-5}$ for best results. The ratio of catalyst/promoter to adsorbers by weight is in the range of $1 \times 10^{-6}$:1 to about 1:3 and most preferably from about $2 \times 10^{-6}$:1 to about 1:9 for enhanced results.

The adsorbers can have a crush strength ranging from 1 to 10 lbs/mm and preferably between 2 and 8 lbs/mm. The attrition weight of the regenerated adsorbers being recycled through the granular bed filter can range from 0.1% to 2% and is preferably less than 1% per day for less downtime. The surface area-to-weight ratio of the adsorbers can range from 5 to 400 m$^2$/g unsteamed, and 2 to 250 m$^2$/g if steamed during pretreatment. The pore volume of the adsorbers can range from 0.3 to 1.5 m$^2$/g unsteamed, and preferably from 0.25 to 1 m$^2$/g if steamed during pretreatment. The pore radius of the adsorbers can range from 30 to 90 Å unsteamed, and preferably from 50 to 200 Å if steamed during pretreatment.

The bulk density of the moving bed of adsorbers can range from 20 to 120 lbs/ft$^3$ and preferably about 40 lbs/ft$^3$. The bed of adsorbers moves downwardly on the order of 1 to 30 in/hr and preferably from about 2 to 20 in/hr. The flue gas residence time in the bed of adsorbers can range from 1 to 10 seconds and preferably is about 2 seconds with a superficial flue gas velocity through the bed ranging from 0.5 to 5 ft/sec and preferably from about 1 to 2 ft/sec.

The solids residence time of the particulates as well as the adsorbers in the granular bed filter and scrubber is from 1 to 10 hours and preferably from 2 to 4 hours for greater efficiency. The gas residence time of the flue gases in the granular bed filter and scrubber is from 1 to 5 seconds and preferably from 2 to 4 seconds for greater effectiveness.

The lift pipe riser/adsorber-regenerator is preferably operated at a temperature of 1,000° F. to 1,600° F. and preferably from 1,200° F. to 1,400° F., at a total pressure ranging from 15 to 300 psia and preferably from atmospheric pressure to 150 psia, at a hydrogen partial pressure ranging from 0.1 p to 1 p psia and preferably at least 0.5 p for best results when hydrogen is used as the regenerating reducing gas. The solids residence time of the particulates as well as the adsorbers in the lift pipe riser can be from 15 seconds to 10 minutes, preferably from 60 to 150 seconds and the gas residence time in the lift pipe riser can be from about 10 to about 30 seconds, preferably from about 16 to about 18 seconds for best results. The spent adsorbers are heated in the lift pipe riser to a temperature ranging from 800° F. to 1,600° F. and preferably from 1,200° F. to 1,400° F. for best results. The lift gas velocity in the lift pipe riser can range from 5 to 100 ft/sec and preferably from about 20 to 40 ft/sec for best results.

The conversion level of removing particulates from the flue gas stream in the granular bed filter and scrubber is from 50% to 100% and preferably at least 95% for best results. The conversion level of removing sulfur oxides (SOx) from flue gases in the granular bed filter and scrubber is from 50% to 10% and preferably at least 95% for best results. The conversion level of removing nitrogen oxides (NOx) from flue gases in the granular bed filter and scrubber is from 50% to 100% and preferably at least 95% for best results.

The conversion level of removing particulates from the spent adsorbers in the lift pipe riser is from about 90% to 100% and preferably from about 95% to about 98% for better efficiency. The conversion level of converting sulfur oxides and/or sulfates to hydrogen sulfide ($H_2S$) in the lift pipe riser is from about 80% to 100% and preferably greater than 99% for greater efficiency.

While the above operating conditions are preferred for best results, in some circumstances it may be desirable to use other operating conditions. Furthermore, while the described granular bed filter and scrubber is preferred to most effectively remove particulates, sulfur oxides, and nitrogen oxides from flue gases, in some circumstances it may be desirable to use other types of vessels, devices, or apparatus to simultaneously remove particulates, sulfur oxides, and nitrogen oxides from flue gases, such as those shown in U.S. Pat. Nos. 4,017,278; 4,126,435; and 4,421,038, which are hereby incorporated by reference in their entirety.

The sulfur oxide-capturing catalyst/promoter can be impregnated, deposited, or sprayed onto the adsorbers or fed separately with the adsorbers into the granular bed filter and scrubber. Alternatively, the catalyst/promoter can be incorporated into the adsorbers during their manufacture.

EXAMPLE 1

A sulfur dioxide ($SO_2$) adsorption capacity test was conducted with flue gas having an inlet composition of 1,000 ppmv sulfur dioxide, 3% by volume molecular oxygen ($O_2$) and 2% by volume water vapor ($H_2O$), with a gas flow rate of about 10 cc/min at a temperature of 1,200° F. Alumina adsorbers were used having a crush strength of 7.47 lbs/mm, an attrition rate of 0.06%, an unsteamed surface area of 198 $m^2$/g, a pore volume of 0.3609 cc/g unsteamed, and a pore radius of 32 Å unsteamed. The alumina adsorbers removed 204 $\mu$l of sulfur dioxide ($SO_2$) per 50 mg of adsorbers.

EXAMPLE 2

A sulfur dioxide adsorption capacity test was conducted under the same conditions as in Example 1, except that the alumina adsorbers had a crush strength of 1.75 lbs/mm, an attrition rate of 0.01%, a surface area of 269 $m^2$/g unsteamed, a pore volume of 0.8426 cc/g unsteamed, and a pore radius of 38 Å unsteamed. The adsorbers removed 241 $\mu$l of sulfur dioxide ($SO_2$) per 50 mg of adsorbers.

EXAMPLE 3

A sulfur dioxide adsorption capacity test was conducted under the conditions of Example 1, except that the alumina adsorbers were impregnated with 2 ppm platinum catalyst/promoter to promote the adsorption of SOx. The platinum-promoted alumina adsorbed 270 $\mu$l sulfur dioxide ($SO_2$) per 50 mg of adsorbers.

EXAMPLE 4

A sulfur dioxide adsorption capacity test was conducted under the conditions of Example 2, except that the alumina adsorbers were impregnated with 2 ppm platinum. The platinum-promoted alumina adsorbers removed 393 $\mu$l of sulfur dioxide ($SO_2$) per 50 mg of adsorbers.

EXAMPLE 5

A sulfur dioxide adsorption capacity test was conducted under the conditions of Example 1, except that the alumina adsorbers were impregnated with 6 ppm platinum. The platinum-promoted alumina adsorbers removed 324 $\mu$l sulfur dioxide ($SO_2$) per 50 mg of adsorbers.

EXAMPLE 6

A sulfur dioxide adsorption capacity test was conducted under the conditions of Example 2, except that the alumina adsorbers were impregnated with 6 ppm platinum. The platinum-promoted alumina adsorbers removed 414 $\mu$l of sulfur dioxide ($SO_2$) per 50 mg of adsorbers.

EXAMPLE 7

A regeneration test was conducted to regenerate the spent platinum-promoted alumina adsorbers of Example 4, while simultaneously removing the captured sulfur oxide (SOx) and/or sulfate from the adsorbers. The spent adsorbers were exposed to a pure dry hydrogen stream flowing at 10 cc/min for about 30 seconds at a temperature of 1,200° F. The promoter was then subjected to an air purge to oxidize the platinum sulfide to platinum. The regenerated adsorbers were then used to adsorb the sulfur dioxide ($SO_2$) in the flue gas of Example 4 and achieved virtually a 100% sulfur dioxide ($SO_2$) removal rate in less than 10 seconds.

EXAMPLE 8

A sulfur dioxide adsorption test was conducted on the flue gas of Example 1 but at a temperature of 382° F. and using adsorbers comprising 100 mole percent magnesium (MgO) impregnated with 6% by wt ceria ($CeO_2$) After 92 min., 26,300 $\mu$l of sulfur dioxide ($SO_2$) per 50 mg of adsorbers were adsorbed.

EXAMPLE 9

A sulfur dioxide adsorption test was conducted under the conditions of Example 8, except that the ceria-impregnated adsorbers contained 92.6 mole percent magnesium and 7.4 mole percent alumina. The adsorbers removed 16,700 $\mu$l of sulfur dioxide ($SO_2$) per 50 mg of adsorbers.

EXAMPLE 10

A sulfur dioxide adsorption test was conducted under the conditions of Example 8, except that the ceria-impregnated adsorbers contained 18.5 mole percent magnesia and 8.5 mole percent alumina. The adsorbers removed 10,550 $\mu$l of sulfur dioxide ($SO_2$) per 50 mg of adsorbers.

EXAMPLE 11

A sulfur dioxide adsorption test was conducted under the conditions of Example 8, except that the ceria-impregnated adsorbers contained 55.8 mole percent magnesia and 44.2 mole percent alumina. The adsorbers removed 4,100 $\mu$l of sulfur dioxide ($SO_2$) per 50 mg of adsorbers.

EXAMPLE 12

A sulfur dioxide adsorption test was conducted under the conditions of Example 8, except that the ceria-impregnated adsorbers contained 33.5 mole percent magnesia and 66.5 mole percent alumina. The adsorbers removed 1,700 $\mu$l of sulfur dioxide ($SO_2$) per 50 mg of adsorbers.

EXAMPLE 13

A sulfur dioxide adsorption test was conducted under the conditions of Example 8, except that 100 mole % alumina adsorbers impregnated with 6% by weight ceria were used. The adsorbers removed 650 $\mu$l of sulfur dioxide ($SO_2$) per 50 mg of adsorbers. The liquid hourly space velocity was 9,600 SCFH.

EXAMPLE 14

An attrition rate test was conducted with the adsorbers in Example 13. The adsorbers were found to have an attrition rate of 20.5%.

EXAMPLE 15

An attrition rate test was conducted with adsorbers comprising 16.7 mole percent magnesia and 83.3 mole percent alumina impregnated with 6 weight percent ceria. The adsorbers were found to have an attrition rate of 15.8%.

EXAMPLE 16

An attrition rate test was conducted with adsorbers comprising 15 mole percent magnesia and 50 mole percent alumina impregnated with 6 weight percent ceria. The attrition rate was found to be 9.7%.

EXAMPLE 17

An attrition rate test was conducted with adsorbers containing 83.3 mole percent magnesia and 16.7 mole percent alumina. The attrition rate was found to be 7.0%.

In the process of FIG. 1, the sulfur oxides (SOx), nitrogen oxides (NOx) and/or and particulates are at least partially removed by chemical adsorption, sometimes referred to as oxidative adsorption, and the captured SOx and/or sulfates are converted to hydrogen sulfide ($H_2S$) when reacted with a regenerating reducing gas in the regenerator/lift pipe riser.

Although the invention is not to be so limited, it is believed that captured sulfur dioxide ($SO_2$) reacts with alumina adsorbers to form sulfate on the alumina adsorbers in accordance with the following formula:

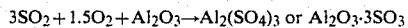

$$3SO_2 + 1.5O_2 + Al_2O_3 \rightarrow Al_2(SO_4)_3 \text{ or } Al_2O_3 \cdot 3SO_3$$

The efficiency of chemical adsorption (oxidative adsorption) in removing sulfur dioxide ($SO_2$) from the flue gases in the granular bed filter and scrubber is enhanced if the operating temperature of the granular bed filter and scrubber is in the range of 1,200° F. to 1,400° F.

The spent adsorbers containing the sulfate are regenerated in the lift pipe riser by reacting the spent adsorbers with a regenerating reducing gas, such as hydrogen, ammonia, or light hydrocarbon gases, such as methane, to remove and convert the alumina sulfate to hydrogen sulfide ($H_2S$). The regeneration of the adsorbers and the removal of the captured sulfur dioxide and/or sulfates in the lift pipe riser is sometimes referred to as desorption.

The adsorbers in the granular bed filter and scrubber may remove the sulfur oxides (SOx) and particulates from the flue gas streams in the granular bed filter and scrubber by physical non-oxidative adsorption at a temperature ranging from 200° F. to 800° F. and preferably at least 600° F. for best results. Although the invention is not to be so limited, it is believed that the adsorption process for physically adsorbing sulfur dioxide on alumina adsorbers can be characterized by the following formula:

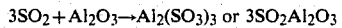

$$3SO_2 + Al_2O_3 \rightarrow Al_2(SO_3)_3 \text{ or } 3SO_2Al_2O_3$$

Figure 2:
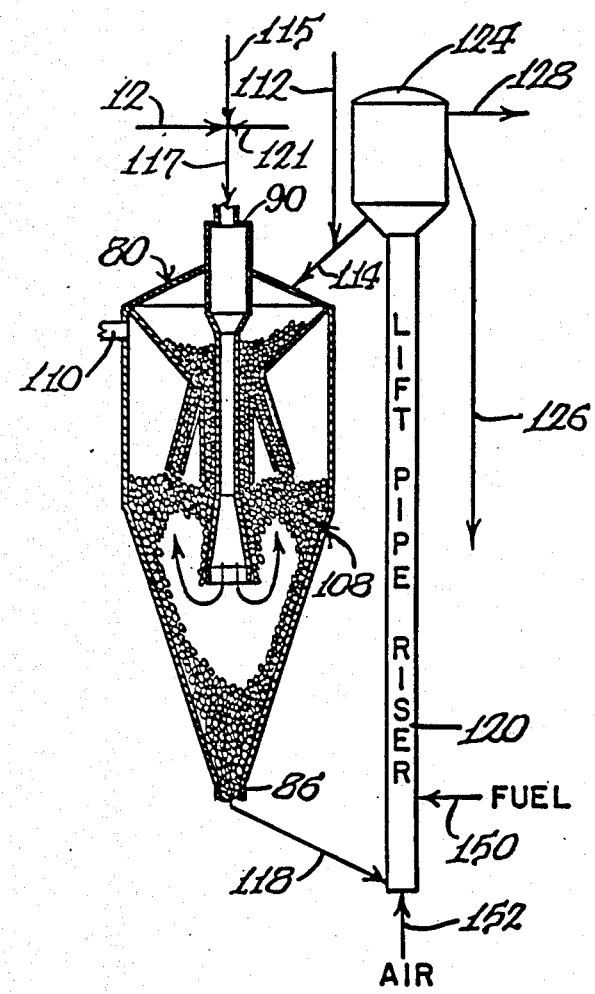
FIG. 2 is a schematic flow diagram of part of the gas purification process with air, instead of a regenerating reducing gas, being injected into the lift pipe riser.

The process of FIG. 2 is similar to the process of FIG. 1, except that the spent adsorbers are thermally regenerated in the lift pipe riser 120 by heat, preferably by combustion with an oxygen-containing combustion-sustaining gas, such as air, instead of a reducing gas, to remove the captured particulates, sulfur oxides (SOx) and/or sulfates ($SO_4$) from the spent adsorbers. Additional heat required for thermal regeneration can be supplied by combusting an auxiliary or supplemental fuel while in contact with the spent adsorbers. The fuel can be injected into the lower portion of the lift pipe riser through an auxiliary or supplemental fuel line 150. The fuel can be hydrogen sulfide, torch oil, such as kerosene, or light hydrocarbon gases, such as methane. While the previously listed fuels are preferred for efficiency and availability reasons, other fuels can be used, if desired. Air is injected upwardly into the lift pipe riser through air injector line 152 at a sufficient pressure and velocity to convey, propel, carry, and transport the adsorbers along with the particulates and sulfur oxides to the overhead collection vessel 124. During thermal regeneration, the particulates are removed (freed) from the adsorbers, the captured sulfur oxides are removed from the adsorbers and become more concentrated, and/or the sulfates are removed from the adsorbers and converted to sulfur dioxide ($SO_2$) The effluent gases containing the concentrated levels of sulfur dioxide ($SO_2$), and sometimes hydrogen sulfide ($H_2S$) from the combusted auxiliary fuel, in the overhead collection vessel are withdrawn from the vessel by gas line 128 and fed to a sulfur recovery unit, such as a Claus plant to recovery elemental sulfur. In some circumstances it may be desirable to use other sources of heat to produce the additional heat required for thermal regeneration of the spent adsorbers, such as hot combustion gases from a separate furnace or indirect heat exchange.

In order to thermally regenerate spent copper-containing adsorbers and release or free the sulfur dioxides from the spent copper-containing adsorbers, the regeneration (combustion) temperature must be at least about 1,562° F. As used herein, copper-containing adsorbers mean adsorbers comprising elemental copper and/or copper compounds, such as a copper oxide. The maximum regeneration temperature for copper-containing adsorbers is preferably about 1,652° F. for enhanced energy efficiency.

The hydrogen sulfide ($H_2S$) in the waste gases in the effluent line 128 (FIG. 1) of the overhead collection vessel 124 can be removed and concentrated by various methods, such as in an amine recovery unit 142 with either diethanolamine (DEA) or monoethanolamine (MEA), the iron sponge process, or the hot potassium carbonate process. A DEA-operating amine unit is preferred because it is more efficient and has less chemical degradation lower make-up risk than the other processes.

The amine recovery unit preferably decreases the concentration of hydrogen sulfide in the waste gas stream to less than 1 part per cubic foot of gas. DEA is preferred over MEA because of degradation of MEA by carbonyl sulfide and carbon disulfide in the gases. Although the invention is not to be so limited, it is believed that DEA amine solutions will absorb both hydrogen sulfide ($H_2S$) and carbon dioxide ($CO_2$) according to the following reaction:

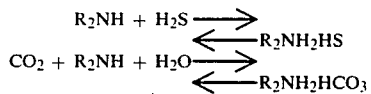

Absorption of hydrogen sulfide occurs in the amine recovery unit at 100° F. or below and rejection of sulfide is active at 240° F. The amine desulfurization process which occurs in the amine recovery unit involves contacting the sour sulfur-containing gas stream (waste gases) with a cool DEA amine solution to absorb the hydrogen sulfide and then regenerating the amine and stripping the hydrogen sulfide from the amine solution by heating.

Figure 3:
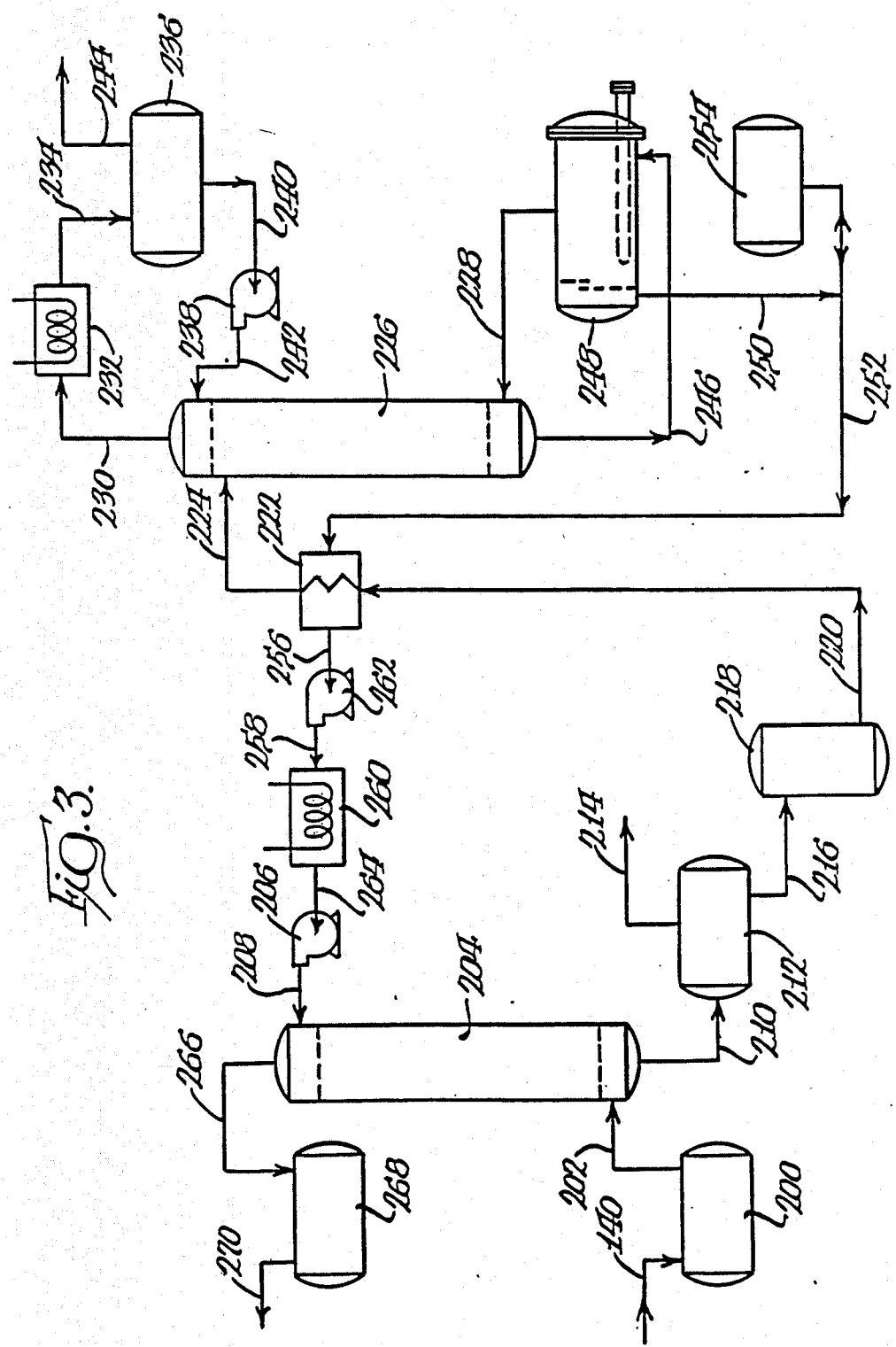
FIG. 3 is a schematic flow diagram of an amine recovery unit.

In the preferred embodiment, the amine recovery unit takes the form shown in FIG. 3, although other types of amine recovery units can be used, if desired. In the embodiment of FIG. 3, sour waste gases (acid gases) in waste gas line 140 are fed to an inlet scrubber 200 which removes (scrubs) entrained liquids, including distillate and water, from the waste gases. The scrubbed gases are discharged from the inlet scrubber through scrubber discharge line 202 and fed to the bottom portion of a contactor or absorber column 204. A DEA amine feed is pumped into the top portion of the absorber column by amine charge pump 206 via amine feed line 208. In the adsorber column, the scrubbed waste gases are contacted in countercurrent flow relationship with the amine feed to react the hydrogen sulfide and the carbon dioxide in the waste gases with the amine. The adsorber column can be a trayed or packed tower and provides gas-liquid con- tact.

Rich amine is discharged from the bottom of the adsorber column through rich amine line 210 and fed to a flash tank 212 where it is flashed at a reduced pressure to remove entrained gases through entrained gas line 214. The flashed rich amine gases are discharged from the bottom of the flash tank through discharge line 216 and fed to and filtered in a carbon filter 218. The filtered rich amine is fed through filtered amine line 220 to a rich/lean amine heat exchanger 222 where the rich amine is heated. The heated rich amine is discharged from the heat exchanger through heated rich amine line 224 and fed to the upper portion of a stripper column, steam stripper, or still 226.

Steam is injected into the lower portion of the steam stripper 226 through steam injection line 228. In the steam stripper, the rich amine solution is regenerated and stripped of acid gases by the steam. The concentrated acid gases are withdrawn from the steam stripper through overhead acid gas line 230 and cooled in a water cooler or condenser 232. The cooled acid gases are passed through cooled acid gas line 234 and collected in a reflux accumulator 236. Part of the concentrated acid gases in the reflux accumulator can be recycled, refluxed, and pumped into the upper portion of the steam stripper (stripper column) 226 by reflux pump 238 via reflux lines 240 and 242. The excess acid gases can be discharged from the reflux accumulator through excess gas line 244 and processed downstream or sent to a sulfur recovery unit, such as a Claus plant.

The stripped rich amine is discharged from the bottom of the steam stripper 226 through stripped amine 246 and fed to a reboiler 248. Steam is boiled out of the amine in the reboiler and withdrawn through overhead steam line 228 where it is injected into the lower portion of the steam stripper 226. The residual boiled lean amine is discharged from the reboiler through lean amine discharge line 250 and passed through lean amine line 252 to heat exchanger 222. The inventory of the lean amine in amine line 252 is controlled by surge tank 254.

Lean amine exits the heat exchanger 222 through outlet line 256 and is pumped through line 258 to a cooler or heat exchanger 260 by booster pump 262. The lean amine solution is cooled in the heat exchanger 260. The cooled amine is discharged from the heat exchanger 260 through cooled amine line 264 and pumped through lean amine feed line 208 into the upper portion of the absorber column 204 by amine charge pump 206.

Effluent gases are withdrawn from the absorber column through overhead gas line 266 and fed to an outlet scrubber 268. The outlet scrubber scrubs the gases from the gas line 266 to recover any residual amine solution carried over in the effluent gases. The sweet scrubbed gases are discharged from the outlet scrubber through sweet gas line 270.

Figure 4:
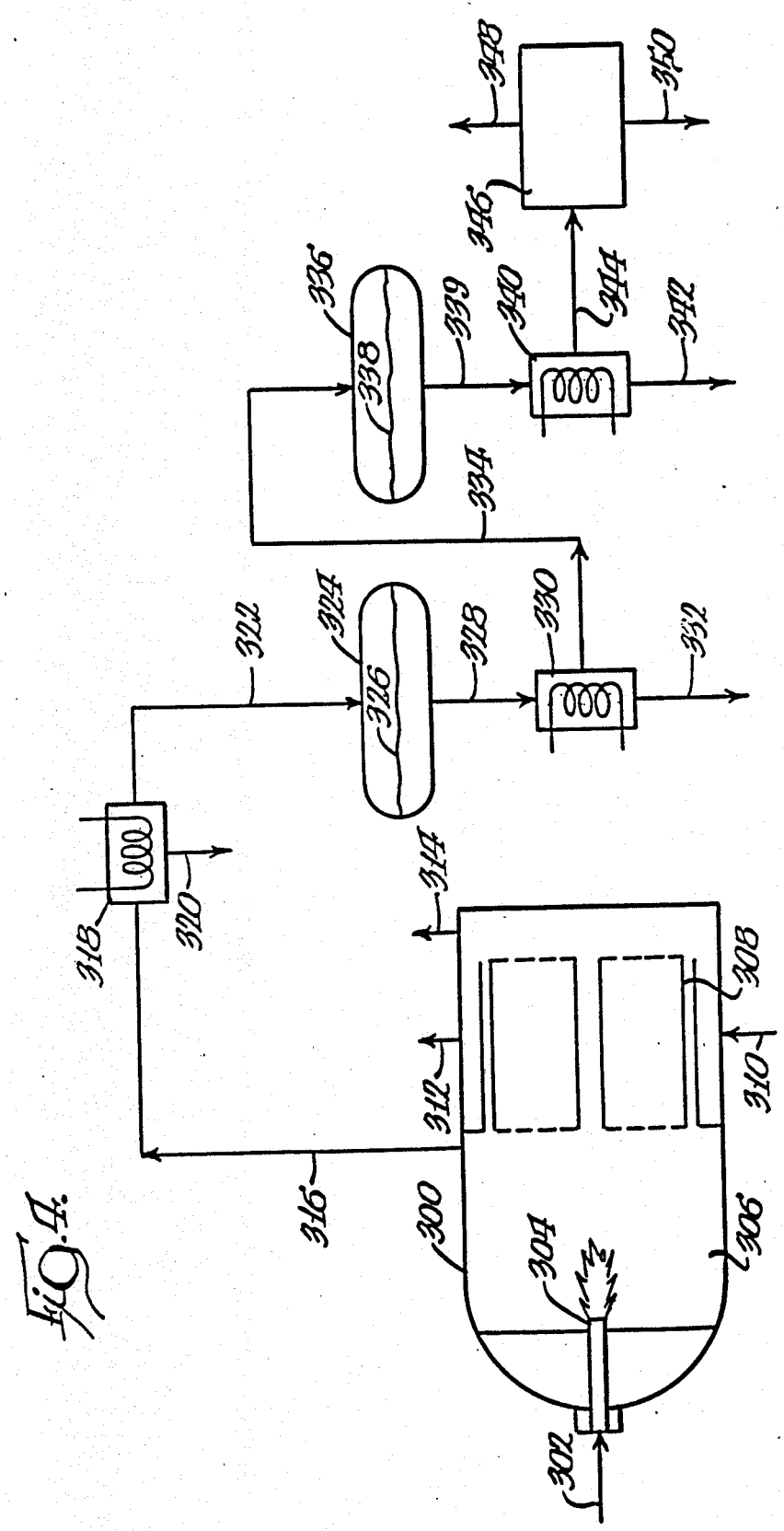
FIG. 4 is a schematic flow diagram of a sulfur recovery unit.

The acid waste gases in lines 140 and 150 (FIG. 1), as well as the acid gases in acid gas line 244 from the reflux accumulator 236, are fed to a sulfur recovery unit and scavenger plant, preferably a Claus plant, such as the type shown in FIG. 4. Hydrogen sulfide from the vapor recovery and upgrading unit (not shown) downstream of the catalytic cracker can also be fed to the Claus plant. The Claus plant can recover 99.0% or more of the elemental sulfur in the influent acid gases.

As shown in FIG. 4, in a typical Claus plant, acid gases enter an oxidation unit and waste-heat boiler 300 through an acid gas inlet line 302. In the oxidation unit about one-third of the hydrogen sulfide ($H_2S$) in the acid gases is oxidized to sulfur dioxide ($SO_2$) and water or steam in accordance with the following exothermic reaction:

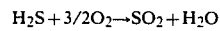

The reaction furnace section 306 of the unit 300 is downstream of the burner 304 and provides a thermal region in which about 70% by weight of the hydrogen sulfide ($H_2S$) of the remaining acid gases and the sulfur dioxide ($SO_2$) is converted to elemental molecular sulfur and water or steam in accordance with the following endothermic reaction:

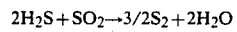

Water is fed into the boiler section 308 of the unit 300 through water line 310. The hot reaction gases in the reaction furnace, which can be at a temperature such as 2,300° F., are cooled by the water in the water pipes of the boiler section to a much cooler temperature, such as 1,100° F. The water in the water pipes of the boiler section is boiled and heated by the hot reaction gases and converted to steam. Steam is removed from the boiler section through steam line 312. In the boiler section, the elemental sulfur is converted to $S_6$ and $S_8$ in accordance with the following exothermic reactions:

Hot gases containing $S_6$ and $S_8$ are withdrawn from the unit through gas bypass line 314.

The partially stripped reaction gases are removed from the unit 300 through outlet gas line 316. The stripped reaction gases typically contain hydrogen sulfide ($H_2S$), sulfur dioxide ($SO_2$), elemental sulfur ($S_2$), nitrogen ($N_2$), carbonyl sulfide (COS), carbon disulfide (CS$_2$), and steam. The stripped reaction gases can be withdrawn from the unit through gas line 316 at a temperature ranging from 550° F. to 600° F. The stripped reaction gases in the gas line 316 are fed to a heat exchanger 318 to cool the reaction gases to about 530° F. and condense or precipitate some of the sulfur. The condensed or precipitated sulfur is removed from the heat exchanger through sulfur line 320.

The cooled reaction gases are withdrawn from the heat exchanger 318 through cooled gas line 322 and fed to a first Claus converter 324. The bottom portion of the converter contains a fixed catalyst bed 326. The reaction gases are passed through the fixed catalyst bed in the first converter to catalytically react the remaining hydrogen sulfide (H$_2$S) with the sulfur dioxide (SO$_2$) to form water and free sulfur. The products are heated by the catalytic reaction to over 650° F. The reaction products are discharged from the first converter through discharge line 328 and cooled in a cooler or heat exchanger 330 to condense, precipitate, and/or recover more sulfur. The sulfur is removed from the heat exchanger through sulfur recovery line 332.

The cooled reaction gases, which can be cooled to below 400° F., are withdrawn from the heat exchanger 330 through cooled reaction gas line 334 and fed to a second Claus converter 336. The second Claus converter also has a fixed catalyst bed 338. The reaction products are passed through the catalyst bed 338 to catalytically react the remaining hydrogen sulfide (H$_2$S) with the sulfur dioxide (SO$_2$) to form water and free sulfur. The resulting reaction products are heated to a temperature slightly below 500° F. by the reaction in the second converter. The reaction products are discharged from the second converter through reaction product outlet line 339 and cooled in a cooler or heat exchanger 340 to condense, precipitate, and/or remove substantially all of the remaining sulfur.

The sulfur is removed from the heat exchanger 340 through sulfur recovery line 342. The cooled tail gases are withdrawn from the heat exchanger 340 through tail gas outlet line 344 and passed to tail gas clean-up equipment 346, such as Beavon and Stretford processing equipment, to clean up the tail gases. The sweet cleansed tail gases are withdrawn from the tail gas clean-up equipment through sweet gas line 348. Sulfur recovered from the tail gases are removed from the tail gas clean-up equipment through sulfur recovery line 350.

While the above two-stage Claus plant is preferred because it recovers at least 95% elemental sulfur, other types of Claus plants can be used, if desired, such as a split-stream Claus plant, a partial-oxidation Claus plant, an ultra three-stage Claus plant, etc.

Among the many advantages of this invention are:
1. Control of emission of pollutants and contaminants into the atmosphere.
2. Enhanced removal of nitrogen oxides.
3. Effective removal of sulfur oxides.
4. Improved removal of particulates.
5. Economy of equipment.
6. Process efficiency.

Although embodiments of this invention have been shown and described, it is to be understood that various modifications and substitutions, as well as rearrangements and combinations of parts, components, equipment, and/or process steps, can be made by those skilled in the art without departing from the novel spirit and scope of this invention.

What is claimed is:

1. A gas purification process, comprising the steps of:
    simultaneously substantially removing nitrogen oxides, sulfur oxides, and particulates in a common vessel from a gaseous stream containing nitrogen oxides, sulfur oxides, and particulates by contacting said gaseous stream with a nitrogen oxide-capturing reducing agent and passing said gaseous stream generally vertically through at least a portion of a bed of granular sulfur oxide-capturing and particulate-removing material, liberating nitrogen and steam and leaving spent granular material carrying removed particulates and sulfur-containing deposits thereon comprising at least one member of the group consisting of sulfur oxides, sulfates, and combinations thereof;
    said sulfur oxide-capturing and particulate-removing material being selected from the group consisting essentially of adsorbers and adsorbers with at least one promoter thereon, said adsorbers comprising an oxide of at least one metal selected from the group consisting of aluminum, bismuth, manganese, yttrium, antimony, tin, rare earth metals, Group 1a metals, and Group 2a metals, and said promoter comprising at least one member, in a free or combined form, selected from the group consisting of rare earth metals, Group 8 noble metals, chromium, vanadium, rhenium, antimony, silver, and combinations thereof;
    said nitrogen oxides being substantially removed by a nitrogen oxide-capturing reducing agent selected from the group consisting essentially of hydrogen, ammonia, ammonia-liberating compounds, light hydrocarbon gases, and combinations thereof;
    simultaneously removing said particulates and sulfur-containing deposits from said spent material in a regenerator while converting said sulfur-containing deposits to hydrogen sulfide in said regenerator by reacting said spent material with a regenerating reducing gas selected from the group consisting essentially of hydrogen, ammonia, ammonia-liberating compounds, carbon monoxide, gas oils, light hydrocarbon gases, and combinations thereof, to provide regenerated material for use in said bed; and
    feeding said regenerated material directly from said regenerator to said bed in said vessel without substantially heating, cooling, or tempering said regenerated material.

2. A gas purification process in accordance with claim 1 wherein said oxide is on a support selected from the group consisting essentially of silica, alumina, kaolin, diatomaceous earth, boria, mullite, and combinations thereof.

3. A gas purification process, comprising the steps of:
    withdrawing a gaseous stream comprising particulates, nitrogen oxides, and sulfur oxides from a combustor of a processing unit selected from the group consisting of a catalytic cracking unit, a power plant, a paper mill, a steel mill, and a waste treatment facility;
    feeding said gaseous stream to a vessel having a bed of sulfur oxide-capturing and particulate-removing material;
    said sulfur oxide-capturing and particulate-removing material comprises at least one member selected from the group consisting of adsorbers and adsorbers with at least one promoter thereon, said adsorbers substantially comprising an oxide of at least one metal selected from the group consisting of aluminum, bismuth, manganese, yttrium, antimony, tin, rare earth metals, Group 1a metals, and Group 2a metals, and said promoter being selected from the group consisting essentially of rare earth metals, Group 8 noble metals, chromium, vanadium, rhenium, tungsten, silver, and combinations thereof;

feeding a reducing gas selected form the group consisting of hydrogen, ammonia, carbon monoxide, light hydrocarbon gases, and combinations thereof into said vessel; and concurrently removing a substantial portion of said particulates, nitrogen oxides, and sulfur oxides from said gaseous stream in said vessel by
contacting said gaseous stream with said reducing gases in said vessel, and
passing said gaseous stream substantially vertically through a portion of said bed in said vessel.

4. A gas purification process in accordance with claim 7 wherein said reducing gas and said gaseous stream are combined before being fed to said vessel.

5. A gas purification process in accordance with claim 3 wherein said reducing gas and said gaseous stream are fed separately into said vessel.

6. A gas purification process in accordance with claim 3 wherein said reducing gas and said gaseous stream are passed generally downwardly and upwardly through said portion of said bed.

7. A gas purification process in accordance with claim 3 wherein said sulfur oxides are removed by chemical adsorption and said sulfur oxides are converted to sulfates at a temperature ranging from about 1,200° F. to about 1,400° F. and spent adsorbers containing said removed particulates and sulfates are regenerated with a second reducing gas.

8. A gas purification process in accordance with claim 3 wherein said sulfur oxides and particulates are removed by physical adsorption at a temperature ranging from about 500° F. to about 800° F. and spent adsorbers containing said removed sulfur oxides and particulates are regenerated by heating said spent adsorbers.

9. A gas purification process in accordance with claim 3 wherein said sulfur oxide-capturing and particulate-removing material comprises alumina selected from the group consisting essentially of gamma alumina, chi-eta-rho alumina, delta alumina, and theta alumina.

10. A gas purification process in accordance with claim 9 wherein said adsorbers further comprise magnesia.

11. A gas purification process in accordance with claim 3 wherein said sulfur oxide-capturing and particulate-removing material comprises at least one member selected from the group consisting of adsorbers and adsorbers with at least one promoter thereon, said adsorbers substantially comprising an oxide of at least one metal selected from the group consisting of aluminum, bismuth, manganese, yttrium, antimony, tin, rare earth metals, Group 1a metals, and Group 2a metals, and said promoter being selected from the group consisting essentially of rare earth metals, Group 8 metals, chromium, vanadium, rhenium, tungsten, silver, and combinations thereof.

* * * * *

UNITED STATES PATENT OFFICE
CERTIFICATE OF CORRECTION

Patent No. 4,692,318  Dated September 8, 1987

Inventor(s) THOMAS W. TOLPIN - R. A. KRETCHMER

It is certified that error appears in the above-identified patent and that said Letters Patent are hereby corrected as shown below:

Patent reads

| Col. | Line | |
|---|---|---|
| 8 | 64 | "cr" should be -- or -- |
| 9 | 63 | "." should be -- , -- |
| 10 | 1 | "thar" should be -- than -- |
| 16 | 25 | "($H_2S$) Hydrogen" should be -- ($H_2S$). Hydrogen -- |
| 18 | 55 | "10%" should be -- 100% -- |
| 20 | 25 | "($CeO_2$)" should be -- ($CeO_2$). -- |
| 22 | 24 | "($SO_2$) The effluent" should be -- ($SO_2$). The effluent -- |
| 23 | 33 | "con- tact" should be -- contact -- |
| 23 | 64/65 | "amine 246" should be -- amine line 246 -- |
| 24 | 60 | "$S_2 \rightarrow 1/3S_6$and" should be "$S_2 \rightarrow 1/3\ S_6$ and -- |
| 27 | 9 | "frorm" should be -- from -- |
| 27 | 21 | "7" should be -- 3 -- |

Signed and Sealed this

Fourth Day of October, 1988

Attest:

DONALD J. QUIGG

Attesting Officer  Commissioner of Patents and Trademarks